United States Patent [19]

Morman

[11] Patent Number: 4,965,122
[45] Date of Patent: Oct. 23, 1990

[54] REVERSIBLY NECKED MATERIAL

[75] Inventor: Michael T. Morman, Alpharetta, Ga.

[73] Assignee: Kimberly-Clark Corporation, Neenah, Wis.

[21] Appl. No.: 249,050

[22] Filed: Sep. 23, 1988

[51] Int. Cl.$^5$ ............................................. D03D 3/00
[52] U.S. Cl. .................................. 428/225; 428/283; 428/288; 428/326; 428/903; 428/910
[58] Field of Search ............... 428/283, 288, 910, 225; 524/921; 264/291, 292, 348, 289.6, 288.4

[56] References Cited

U.S. PATENT DOCUMENTS

| | | | |
|---|---|---|---|
| 1,741,530 | 12/1929 | Mayer . | |
| 2,971,322 | 2/1961 | Bouvet | 57/14 |
| 3,047,444 | 7/1962 | Harwood | 154/46 |
| 3,059,313 | 10/1962 | Harmon | 28/80 |
| 3,256,258 | 6/1966 | Heneman | 260/93.7 |
| 3,396,071 | 8/1968 | Couzens | 161/150 |
| 3,406,033 | 10/1968 | Reitz | 117/7 |
| 3,438,844 | 4/1969 | Kumin | 161/150 |
| 3,485,695 | 12/1969 | Ness | 156/229 |
| 3,575,784 | 4/1971 | Phillips et al. | 161/150 |
| 3,772,417 | 11/1973 | Vogt | 264/230 |
| 3,932,682 | 1/1976 | Loft et al. | 428/296 |
| 3,949,128 | 4/1976 | Ostermeier | 428/152 |
| 4,013,816 | 3/1977 | Sabee et al. | 428/288 |
| 4,193,899 | 3/1980 | Brenner et al. | 260/23.5 |
| 4,209,563 | 6/1980 | Sisson | 428/288 |
| 4,342,812 | 8/1982 | Selwood | 428/286 |
| 4,443,513 | 4/1984 | Meitner | 422/195 |
| 4,467,595 | 8/1984 | Kramers | 57/225 |
| 4,486,485 | 12/1984 | Sookne | 428/198 |
| 4,489,543 | 12/1984 | Bromley et al. | 57/208 |
| 4,515,854 | 5/1985 | Kogame et al. | 428/288 |
| 4,551,378 | 11/1985 | Carey, Jr. | 428/198 |
| 4,554,121 | 11/1985 | Kramers | 264/103 |
| 4,554,207 | 11/1985 | Lee | 428/288 |
| 4,578,307 | 3/1985 | Niki et al. | 428/288 |
| 4,606,964 | 8/1986 | Wideman | 428/152 |
| 4,612,148 | 9/1986 | Motooka et al. | 264/49 |
| 4,652,487 | 3/1987 | Morman | 428/138 |
| 4,657,802 | 4/1987 | Morman | 428/152 |
| 4,696,779 | 9/1987 | Wideman | 264/211.13 |
| 4,720,415 | 1/1988 | Wielen et al. | 428/152 |
| 4,781,966 | 11/1988 | Taylor | 428/288 |

FOREIGN PATENT DOCUMENTS

| | | |
|---|---|---|
| 0019295 | 11/1980 | European Pat. Off. . |
| 0030418 | 6/1981 | European Pat. Off. . |
| 0127483 | 12/1984 | European Pat. Off. . |
| 0180703 | 3/1986 | European Pat. Off. . |
| 0184932 | 6/1986 | European Pat. Off. . |
| 0236091 | 9/1987 | European Pat. Off. . |
| 0237642 | 9/1987 | European Pat. Off. . |
| 1460514 | 6/1978 | Fed. Rep. of Germany . |
| 2046593 | 5/1980 | Fed. Rep. of Germany . |
| 2613963 | 6/1985 | Fed. Rep. of Germany . |
| 2632875 | 8/1985 | Fed. Rep. of Germany . |
| 2757526 | 3/1986 | Fed. Rep. of Germany . |
| 3438859 | 6/1989 | Fed. Rep. of Germany . |
| 2205407 | 8/1982 | France . |
| 1217498 | 12/1970 | United Kingdom . |
| 1308904 | 3/1973 | United Kingdom . |
| 1399666 | 7/1975 | United Kingdom . |
| 1487488 | 9/1977 | United Kingdom . |
| 1532467 | 11/1978 | United Kingdom . |
| 1538671 | 1/1979 | United Kingdom . |
| 1575972 | 10/1980 | United Kingdom . |
| 1576436 | 10/1980 | United Kingdom . |
| 2149720 | 11/1984 | United Kingdom . |
| 2175026 | 4/1986 | United Kingdom . |

Primary Examiner—James J. Bell
Attorney, Agent, or Firm—Karl V. Sidor

[57] ABSTRACT

A reversibly necked material capable of stretching at least about 75 percent and recovering at least about 50 percent when stretched about 75 percent, typically in a direction generally parallel to the direction of necking. The reversibly necked material is made by applying a tensioning force to at least one material to neck the material, heating the necked material, and cooling the necked material that the reversibly necked material possesses a greater heat of fusion and/or a lower onset of melting than the material before heating while stretched.

25 Claims, 7 Drawing Sheets

REVERSIBLY NECKED MATERIAL

FIELD OF THE INVENTION

The present invention relates to elasticized materials and a method of making the same.

BACKGROUND OF THE INVENTION

Plastic nonwoven webs formed by nonwoven extrusion processes such as, for example, meltblowing processes and spunbonding processes may be manufactured into products or components of products so inexpensively that the products could be viewed as disposable after only one or a few uses. Representatives of such products include garment materials, diapers, tissues, wipes, garments, mattress pads and feminine care products.

Nonwoven webs formed from nonelastic polymers such as, for example, polypropylene are generally considered nonelastic. The lack of elasticity usually restricts use of these nonwoven web materials from applications where elasticity is necessary or desirable such as, for example, diapers, mattress pads, feminine care products and some of the above mentioned garment materials.

Certain fabric finishing processes such as, for example, dyeing carried out at high dye bath temperatures utilizing roller arrangements that tension the material to be dyed have been observed to shrink webs of nonwoven fibers to a soft, drapeable elastic fabric which can be stretched and can recover to about its pre-stretched dimensions. Additionally, U.S. Pat. No. 3,949,128 to Ostermeier discloses a heat treated material with releasable bonds which can be stretched to about 65 percent and can recover to about its pre-stretched dimensions.

While the known elasticized fabrics provided may be useful for some purposes, fabrics having greater stretch and recovery characteristics are always desirable.

DEFINITIONS

As used herein, the term "recover" refers to a contraction of a stretched material upon termination of a biasing force following stretching length of the material by application of the biasing force. For example, if a material having a relaxed, unbiased length of one (1) inch is elongated 50 percent by stretching to a length of one and one half (1.5) inches the material would be elongated 50 percent (0.5 inch) and would have a stretched length that is 150 percent of its relaxed length. If this exemplary stretched material contracted, that is recovered to a length of one and one tenth (1.1) inches after release of the biasing and stretching force, the material would have recovered 80 percent (0.4 inch) of its one-half (0.5) inch elongation. Recovery may be expressed as [(maximum stretch length—final sample length)/(maximum stretch length—initial sample length)]×100.

As used herein, the term "nonwoven web" means a web that has a structure of individual fibers or threads which are interlaid, but not in an identifiable repeating manner. Nonwoven webs have been, in the past, formed by a variety of processes such as, for example, meltblowing processes, spunbonding processes and bonded carded web processes.

As used herein the term "microfibers" means small diameter fibers having an average diameter not greater than about 100 microns, for example, having a diameter of from about 0.5 microns to about 50 microns, more specifically microfibers may also have an average diameter of from about 4 microns to about 40 microns.

As used herein, the term "interfiber bonding" means bonding produced by entanglement between individual meltblown fibers to form a coherent web structure without the use of thermal bonding. This fiber entangling is inherent in the meltblown processes but may be generated or increased by processes such as, for example, hydraulic entangling or needlepunching. Alternatively and/or additionally, a bonding agent can be utilized to increase the desired bonding and to maintain structural coherency of the web. For example, powdered bonding agents and chemical solvent bonding may be used.

As used herein, the term "meltblown fibers" means fibers formed by extruding a molten thermoplastic material through a plurality of fine, usually circular, die capillaries as molten threads or filaments into a high velocity gas (e.g. air) stream which attenuates the filaments of molten thermoplastic material to reduce their diameters, which may be to microfiber diameter. Thereafter, the meltblown fibers are carried by the high velocity gas stream and are deposited on a collecting surface to form a web of randomly disbursed meltblown fibers. Such a process is disclosed, for example, in U.S. Pat. No. 3,849,241 to Butin, the disclosure of which is hereby incorporated by reference.

As used herein, the term "spunbonded fibers" refers to small diameter fibers which are formed by extruding a molten thermoplastic material as filaments from a plurality of fine, usually circular, capillaries in a spinnerette with the diameter of the extruded filaments then being rapidly reduced, for example, by eductive drawing or other well-known spun bonding mechanisms. The production of spun-bonded nonwoven webs is illustrated in patents such as, for example, in U.S. Pat. No. 4,340,563 to Appel et al., and U.S. Pat. No. 3,692,618 to Dorschner et al. The disclosures of both these patents are hereby incorporated by reference.

As used herein, the term "necked material" refers to any material which has been constricted in at least one dimension by processes such as, for example, drawing or gathering.

As used herein, the term "neckable material" means any material which can be necked.

As used herein, the term "reversibly necked material" refers to a necked material that has been treated while necked to impart memory to the material so that, when a force is applied to extend the material to its pre-necked dimensions, the necked and treated portions will generally recover to their necked dimensions upon termination of the force. One form of treatment is the application of heat. Generally speaking, extension of the reversibly necked material is substantially limited to extension to its pre-necked dimensions. Therefore, unless the material is elastic, extension too far beyond its pre-necked dimensions will result in material failure. A reversibly necked material may include more than one layer. For example, multiple layers of spunbonded web, multiple layers of meltblown web, multiple layers of bonded carded web or any other suitable combination or mixtures thereof.

As used herein, the term "percent neckdown" refers to the ratio determined by measuring the difference between the pre-necked dimension and the necked dimension of a neckable material and then dividing that difference by the pre-necked dimension of the neckable material.

As used herein, the term "percent stretch" refers to the ratio determined by measuring the increase in the stretched dimension and dividing that value by the original dimension, i.e., (increase in stretched dimension/original dimension)×100.

SUMMARY OF THE INVENTION

The present invention overcomes the limitation to 65 percent stretch/recovery ratios that previously existed by providing a reversibly necked material capable of stretching at least 75 percent and recovering at least about 50 percent when stretched 75 percent.

The reversibly necked material may be made from any neckable material that can be treated to acquire such memory characteristics. Such neckable materials include, for example, bonded carded webs, spunbonded webs or meltblown webs. The meltblown web may include meltblown microfibers. The reversibly necked material may also have multiple layers such as, for example, multiple spunbond layers and/or multiple meltblown layers. The neckable material may be made of polymers such as, for example, polyolefins. Exemplary polyolefins include polypropylene, polyethylene, ethylene copolymers and propylene copolymers.

The neckable material may also be a composite material made from a mixture of two or more different fibers or a mixture of fibers and other materials. The other materials may include, for example, textile fibers, wood pulp and particulates such as, for example, hydrocolloid (hydrogel) particulates commonly referred to as superabsorbent materials.

If the neckable material is stretchable, it may be necked by stretching in a direction generally perpendicular to the desired direction of neck-down. Alternatively, the material may be compacted to effect neckdown. Memory of the material's necked configuration may be imparted to certain necked materials by:
  heating the necked material; and
  cooling the material while it is still in the necked configuration. Yet other memory creating procedures may be utilized as appropriate for the material.

Heat treatment of the necked material results in a reversibly necked material possessing a greater heat of fusion and/or a lower onset of melting than the material before heating while necked.

DETAILED DESCRIPTION OF THE INVENTION

Figure 1:
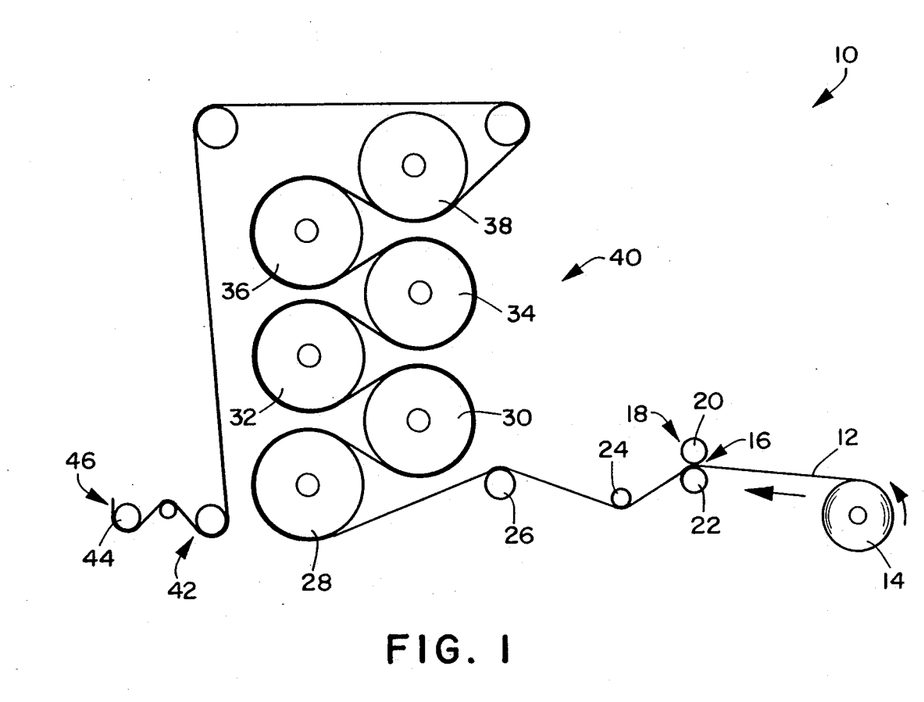
FIG. 1 is a schematic representation of an exemplary process for forming a reversibly necked material using a series of steam cans.

Referring to the drawings where like reference numerals represent like figures or process steps and, in part, to FIG. 1 there is schematically illustrated at 10 an exemplary process for forming a reversibly necked material using a series of steam cans. A neckable material 12 is unwound from a supply roll 14. The neckable material 12 passes through a nip 16 of a drive roller arrangement 18 formed by the drive rollers 20 and 22 and then past two idler rolls 24 and 26.

The neckable material 12 may be formed by known nonwoven processes, such as, for example, meltblowing processes, spunbonding processes or bonded carded web processes and passed directly through the nip 16 without first being stored on a supply roll.

The neckable material 12 may be a nonwoven material such as, for example, spunbonded web, meltblown web or bonded carded web. If the neckable material 12 is a web of meltblown fibers, it may include meltblown microfibers. The neckable material 12 is made from any material that can be treated while necked so that, after treatment, upon application of a force to extend the necked material to its pre-necked dimensions, the material recovers generally to its necked dimensions upon termination of the force. A method of treatment is the application of heat. Certain polymers such as, for example, polyolefins, polyesters and polyamides may be heat treated under suitable conditions to impart such memory. Exemplary polyolefins include one or more of polyethylene, polypropylene, polybutene, ethylene copolymers, propylene copolymers and butene copolymers. Polypropylenes that have been found useful include, for example, polypropylene available from the Himont Corporation under the trade designation PC-973, polypropylene available from the Exxon Chemical Company under the trade designation Exxon 3445, and polypropylene available from the Shell Chemical Company under the trade designation DX 5A09. Chemical characteristics of these materials are available from their respective manufacturers.

In one embodiment of the present invention, the neckable material 12 is a multilayer material having, for example, at least one layer of spunbonded web joined to at least one layer of meltblown web, bonded carded web or other suitable material. For example, the neckable material 12 may be a multilayer material having a first layer of spunbonded polypropylene having a basis weight from about 0.2 to about 8 ounces per square yard (osy), a layer of meltblown polypropylene having a basis weight from about 0.2 to about 4 osy, and a second layer of spunbonded polypropylene having a basis weight of about 0.2 to about 8 osy.

Alternatively, the neckable material 12 may be single layer of material such as, for example, a spunbonded web having a basis weight of from about 0.2 to about 10 osy or a meltblown web having a basis weight of from about 0..2 to about 8 osy.

The neckable material 12 may also be a composite material made of a mixture of two or more different fibers or a mixture of fibers and particulates. Such mixtures may be formed by adding fibers and/or particulates to a gas stream in which meltblown fibers are carried so that an intimate entangled commingling of meltblown fibers and other materials, e.g., wood pulp, staple fibers or particulates such as, for example, superabsorbent materials occurs prior to collection of the fibers upon a collecting device to form a coherent web of randomly dispersed meltblown fibers and other materials such as disclosed in U.S. Pat. No. 4,100,324, the disclosure of which is hereby incorporated by reference.

If the neckable material 12 is a nonwoven web of fibers, the fibers should be joined by interfiber bonding to form a coherent web structure which is able to withstand necking. Interfiber bonding may be produced by entanglement between individual meltblown fibers. The fiber entangling is inherent in the meltblown process but may be generated or increased by processes such as, for example, hydraulic entangling or needlepunching. Alternatively and/or additionally a bonding agent may be used to increase the desired bonding.

After passing through the nip 16 of the driver roller arrangement 18 and idler rollers 24 and 26, the neckable material 12 passes over a series of steam cans 28–38 in a series of reverse S loops. The steam cans 28–38 typically have an outside diameter of about 24 inches although other sized cans may be used. The contact time or residence time of the neckable material on the steam cans to effect heat treatment will vary depending on factors such as, for example, steam can temperature, and type and/or basis weight of material. For example, a necked web of polypropylene may be passed over a series of steam cans heated to a measured temperature from about 90 to about 150° C. (194–302° F.) for a contact time of about 1 to about 300 seconds to effect heat treatment. More particularly, the temperature may range from about 125 to about 143° C. and the residence time may range from about 2 to about 50 seconds.

Because the peripheral linear speed of the drive rollers 20 and 22 is controlled to be lower than the peripheral linear speed of the steam cans 28–38, the neckable material 12 is tensioned between the steam cans 28–38 and the drive rollers 20 and 22. By adjusting the difference in the speeds of the rollers, the neckable material 12 is tensioned so that it necks a desired amount and is maintained in such necked condition while passing over the heated steam cans 28–38. This action imparts memory of the necked condition to the neckable material 12. The neckable material 12 is then cooled in the necked condition after leaving the last steam can 38. The peripheral linear speed of the rollers of the idler roller arrangement 42 are maintained at the same speed as the steam cans 28–38 so that the necked material 12 is cooled in the necked condition on its way to the windup roll 46. This completes formation of the reversibly necked material 44. The reversibly necked material 44 can extend to at least its original, pre-necked dimensions upon application of a stretching force in a direction generally parallel to the direction of necking and then recover to within at least about 50 percent of its reversibly necked dimensions upon release of the stretching force. According to the present invention, elongation or percent stretch values of greater than 170 percent have been achieved.

Conventional drive means and other conventional devices which may be utilized in conjunction with the apparatus of FIG. 1 are well known and, for purposes of clarity, have not been illustrated in the schematic view of FIG. 1.

Figure 2:
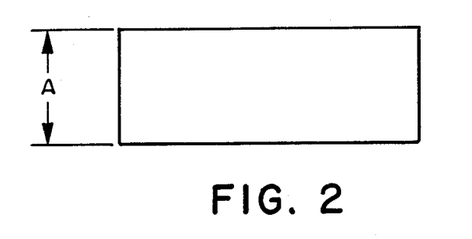
FIG. 2 is a plan view of an exemplary neckable material before tensioning and necking.
Figure 2A:
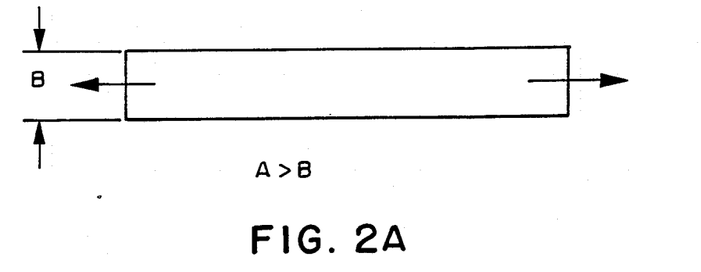
FIG. 2A is a plan view of an exemplary reversibly necked material.
Figure 2B:
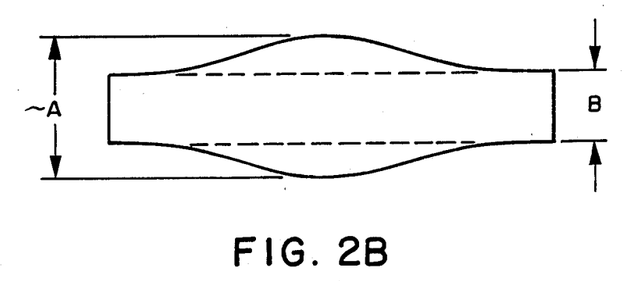
FIG. 2B is a plan view of an exemplary reversibly necked material while partially stretched.

The relation between the original width of the neckable material 12 to its width after tensioning determines the stretch limits of the reversibly necked material 44. For example, with reference to FIGS. 2, 2A, and 2B, if it is desired to prepare a reversibly necked material that can be stretched to a 150 percent elongation (i.e., 250 percent of its necked width) and can recover to within about 25 percent of its necked width, a neckable material shown schematically and not necessarily to scale in FIG. 2 having a width "A" such as, for example, 250 cm, is tensioned so that it necks down to a width "B" of about 100 cm for a percent neck or percent neckdown of about 60 percent and while tensioned, is heat treated to maintain its reversibly necked configuration as shown in FIG. 2A. The resulting reversibly necked material shown schematically and not necessarily to scale in FIG. 2B has a width "B" of about 100 cm and is stretchable to at least the original 250 cm dimension "A" of the neckable material for an elongation or percent stretch of about 150 percent. The reversibly necked material returns to within about 25 percent of its necked width of about 100 cm, (i.e., to a width of about 125 cm) after release of the stretching force for a recovery of about 83 percent.

Figure 3:
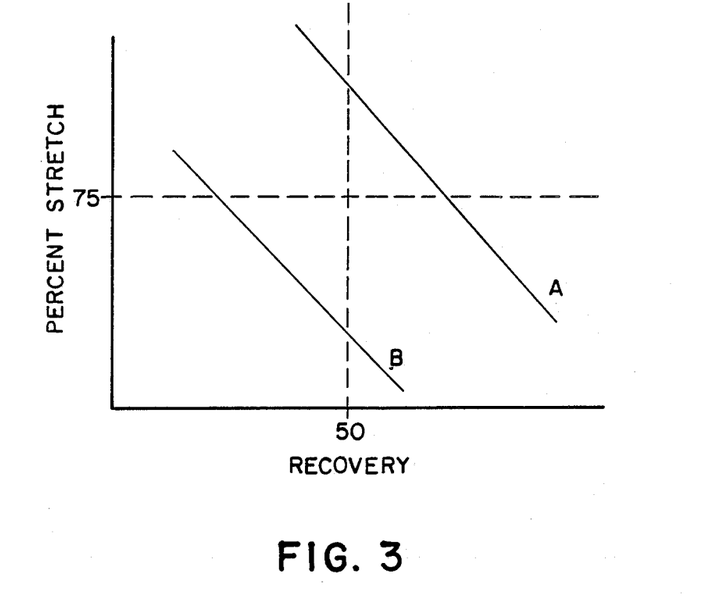
FIG. 3 is a plot of stretch versus recovery showing exemplary stretch/recovery profiles.

The claims of the present invention are meant to encompass materials which are adapted to stretch at least 75 percent and recover at least 50 percent at least at some point during their stretch/recovery profile. For example, the materials of the present invention are adapted to stretch at least 75 percent and recover at least 50 percent when stretched 75 percent. FIG. 3 is a plot of stretch versus recovery showing exemplary stretch/recovery profiles. Curve "A" is an exemplary stretch/recovery profile for a material of the present invention. Curve "B" is an exemplary stretch/recovery profile for a material not encompassed by the present invention.

Although the present invention should not be held to a particular theory of operation, the heat treatment should raise the neckable material 12 to a temperature range for a specified time period where it is believed that additional polymer crystallization occurs while the material is in the necked condition. Because certain types of fibers are formed by methods such as, for example, meltblowing and spunbonding which cool the fibers very quickly, it is believed that the polymers forming the fibers are not fully crystallized. That is, the polymers harden before the crystallization is complete. It is believed that additional crystallization can be effected by increasing the temperature of the material to a temperature below the material's melting point. When this additional crystallization occurs while the material is in the necked condition, it is believed that memory of the necked condition is imparted to the material.

Figure 4A:
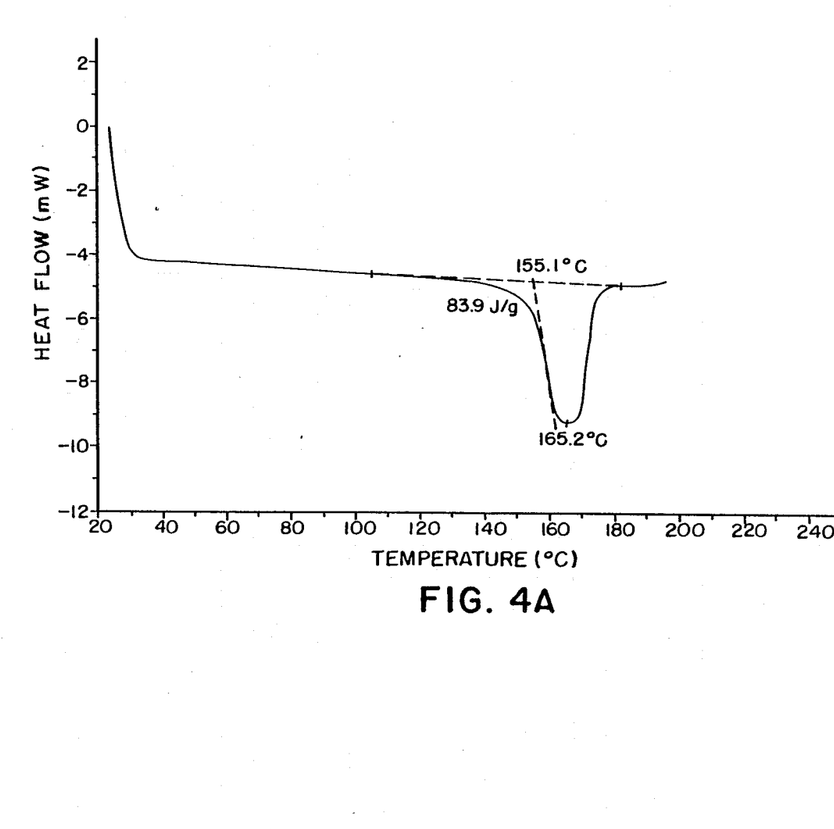
FIG. 4A is an exemplary Differential Scanning Calorimetry scan of a neckable material before heat treatment.
Figure 4B:
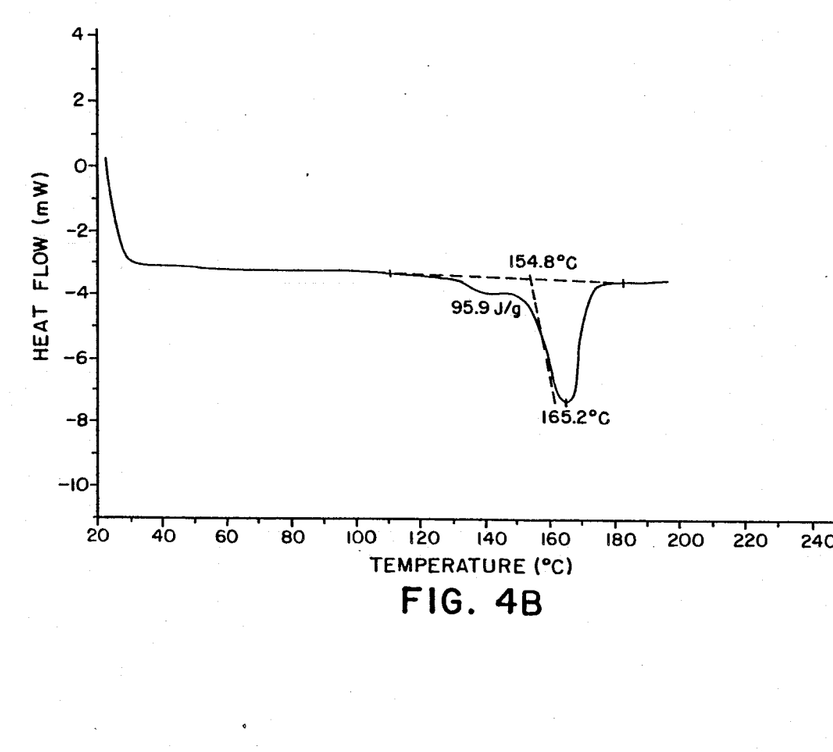
FIG. 4B is an exemplary Differential Scanning Calorimetry scan of a reversibly necked material, i.e., after treatment while necked.

FIG. 4A is an exemplary Differential Scanning Calorimetry scan of a spunbonded polypropylene material. FIG. 4B is an exemplary Differential Scanning Calorimetry scan of the same type of spunbonded polypropylene material which has been necked and heat treated. Differential Scanning Calorimetry can be used to show that neckable materials such as, for example, spunbonded webs, which have been necked and heat treated exhibit greater heats of fusion than the same materials which have not been heat treated. That is, the heat of fusion of a reversibly necked material is typically at least about 5 percent greater than the material before being reversibly necked. For example, from about 5 to about 15 percent greater. Additionally, the onset of melting occurs at lower temperatures for necked and heat treated materials than for their non-heat treated counterparts. That is, the onset of melting of a reversibly necked material typically occurs at a temperature at least about 5° C. lower than for the material before being reversibly necked. For example, from about 5° C. to about 15° C. lower. A greater heat of fusion is believed to result from additional crystallization which occurs during heat treatment. A lower temperature for onset of melting is believed to result from imperfect or strained crystals formed during heat treatment of the material while in the necked condition.

Figure 5:
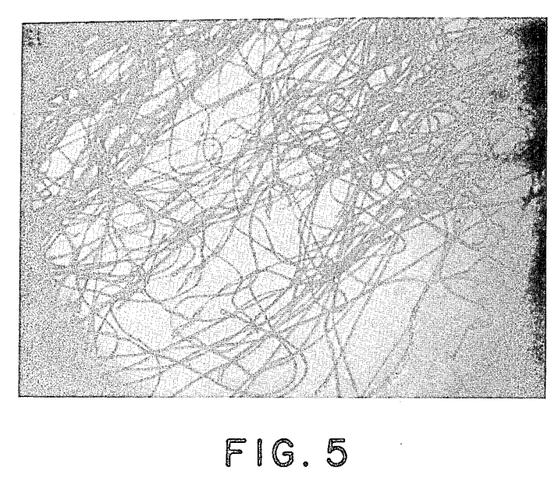
FIG. 5 is an enlarged photomicrograph of an exemplary neckable material, prior to treatment while necked.
Figure 6:
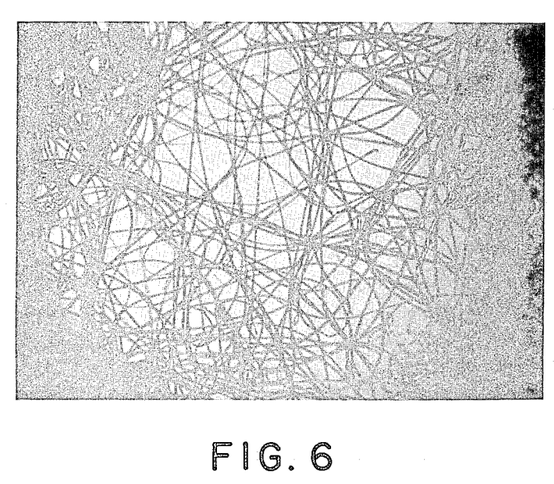
FIG. 6 is an enlarged photomicrograph of an exemplary reversibly necked material.

Tensioning and heat treatment of nonelastic material 12 also adds crimps and kinks to the material as shown in FIG. 5, particularly when compared to the untreated material shown in FIG. 6. These crimps and kinks are believed to add to the stretch and recovery properties of the material.

Figure 7:
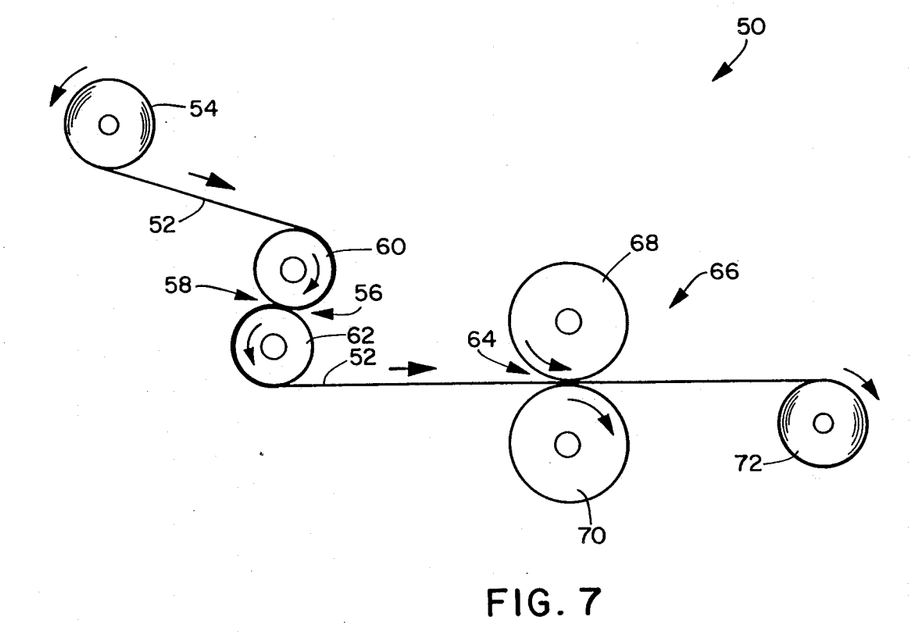
FIG. 7 is a schematic representation of an exemplary process for constricting a neckable material using an S-roll arrangement.

Referring now to FIG. 7 of the drawings, there is schematically illustrated at 50 an exemplary process for pre-necking a neckable material utilizing an S-roll arrangement. A neckable material 52 is unwound from a supply roll 54. The neckable material 52 then travels in the direction indicated by the arrow associated therewith as the supply roll 54 rotates in the direction of the arrow associated therewith. The neckable material 52 then passes through a nip 56 of an S-roll arrangement 58 formed by the stack rollers 60 and 62. Alternatively, the neckable material 52 may be formed by known extrusion processes, such as, for example, known spunbonding or known meltblowing processes, and passed directly through the nip 56 without first being stored on a supply roll.

The neckable material 52 passes through the nip 56 of the S roll arrangement 58 in a reverse-S wrap path as indicated by the rotation direction arrows associated with the stack rollers 60 and 62. From the S-roll arrangement 58, the neckable material 52 passes through the nip 64 of a drive roller arrangement 66 formed by the drive rollers 68 and 70. Because the peripheral linear speed of the stack rollers 60 and 62 of the S-roll arrangement 58 is controlled to be lower than the peripheral linear speed of the drive rollers 68 and 70 of the drive roller arrangement 66, the neckable material 52 is tensioned between the S-roll arrangement 58 and the nip 64 of the drive roller arrangement 66. By adjusting the difference in the speeds of the rollers, the neckable material 52 is tensioned so that it necks a desired amount and is maintained in such necked condition as it is wound on a wind-up roll 72.

Alternatively, a driven wind-up roll (not shown) may be used so the neckable material 52 may be stretched or drawn between the S-roll arrangement 58 and the driven wind-up roll by controlling the peripheral linear speed of the rollers 60 and 62 of the S-roll arrangement 58 to be lower than the peripheral linear speed of the driven wind-up roll. In yet another embodiment, an unwind having a brake which can be set to provide a resistance may be used instead of an S-roll arrangement.

Other methods of tensioning the neckable material 52 may be used such as, for example, tenter frames or various cross-machine direction stretcher arrangements that expand or stretch the neckable material 52 in directions such as, for example, the cross-machine direction so that, after heat treatment, the resulting reversibly necked material (not shown) will be elastic in a direction generally parallel to the direction of necking, e.g., in the machine direction.

The wind-up roll 72 of the necked material 52 is then heated in an oven (not shown) to promote additional crystallization of at least one of the polymers that make up the necked material. Roll 72 of the necked material 52 is then cooled forming the reversibly necked material shown in the enlarged photomicrograph of FIG. 5. Alternatively, neckable material 52 may be necked, passed through a heat chamber (not shown) and then cooled while in the necked condition to form a reversibly necked material (not shown).

EXAMPLES 1-6

The reversibly necked materials of examples 1-6 were made in accordance with the present invention by tensioning a neckable material so that it constricted. The tensioned, necked material was heated to a temperature that increased the crystallinity of the polymer making up the neckable material and then cooled to ambient temperature. Reversibly necked material made in this manner was stretched to about its original, pre-necked dimensions and was found to return to generally its reversibly necked dimensions upon release of the stretching force. Tables 1-9 provide Grab Tensile Test data for control samples and reversibly necked samples to show the effect of necking and heat treatment on the material. The tests were performed on a Constant Rate of Extension tester, Instron Model 1122 Universal Testing Instrument using 4 inch by 6 inch samples. The sample was held by two clamps, each having a rear jaw which was 1 inch×1½ inches. The 1 inch dimension was in the direction parallel to the application of load and the 1½ inch dimension was in the direction perpendicular to the application of load. The front jaw of each clamp was 1 inch×1 inch. Each jaw face had a smooth, rubberized, gripping surface. The following mechanical properties were determined for each sample: Peak Load, Peak Total Energy Absorbed, and Percent Elongation.

Control samples and reversibly necked samples were also cycled on the Instron Model 1122 with Microcon II - 50 kg load cell. The jaw faces of the tester were 1 inch by 3 inches so the samples were cut to 3 inches by 7 inches (7 inches in the direction to be tested) and weighed individually in grams. A 4 inch gauge length was used. Chart and crosshead speeds were set for 20 inches per minute and the unit was zeroed, balanced and calibrated according to the general procedure. The maximum extension limit for the cycle length was set at a distance determined by calculating 56 percent of the "elongation to break" from the Grab Tensile Test. The sample was cycled to the specified cycle length four times and then was taken to break on the fifth cycle. The test equipment was set to report Peak Load in pounds force, Peak Elongation in inches and Peak Energy Absorbed in inch pounds force per square inch. The area used in the energy measurements (i.e., the surface area of sample tested) is the gauge length (four inches) times the sample width (3 inches) which equals twelve square inches. The results of the Grab Tensile Tests and cycle tests have been normalized for the measured basis weights of the samples.

Peak Total Energy Absorbed (TEA) as used herein is defined as the total energy under the stress versus strain (load versus elongation) curve up to the point of "peak" or maximum load. TEA is expressed in units of work/(length)$^2$ or (pounds force * inch)/(inches)$^2$. These values have been normalized by dividing by the basis weight of the sample in ounces per square yard (osy) which produces units of [(lbs$_f$ * inch)/inch$^2$]/osy.

Peak Load as used herein is defined as the maximum value of load or force encountered in elongating the sample to break. Peak Load is expressed in units of force (lbs$_f$) which have been normalized for the basis weight of the material resulting in a number expressed in units of lbs$_f$/(osy).

Elongation as used herein is defined as relative increase in length of a specimen during the tensile test. Elongation is expressed as a percentage, i.e., [(increase in length)/(original length)]×100.

Permanent Set after a stretching cycle as used herein is defined as a ratio of the increase in length of the sample after a cycle divided by the maximum stretch during cycling. Permanent Set is expressed as a percentage, i.e., [(final sample length—initial sample length)/(maximum stretch during cycling—initial sample length)]×100. Permanent set is related to recovery by the expression [permanent set=100−recovery] when recovery is expressed as a percentage.

EXAMPLE 1

A neckable multilayer material of 0.6 osy spunbonded polypropylene, 0.6 osy meltblown polypropylene, and 0.6 osy spunbonded polypropylene having a total basis weight of 1.8 osy was tested on an Instron Model 1122 Universal Testing Instrument. The results are reported in Tables 1 and 2 under the heading "Control 1." The machine direction peak total energy absorbed is given in the column of Table 1 entitled "MD TEA." The machine direction peak load is given in the column entitled "MD Peak Load." The machine direction elongation to break is given in the column entitled "MD Elong." The cross-machine direction peak total energy absorbed is given in the column entitled "CD TEA." The cross-machine direction peak load is given in the column entitled "CD Peak Load." The cross-machine direction elongation to break is given in the column entitled "CD Elong."

Peak TEA, Peak Load, and Permanent Set are given for each stretch cycle in Table 2. At the end of the series of cycles, the sample was elongated to break and the results reported under the heading "To Break." The elongation value in the "To Break" column and "Perm Set" row is the elongation at peak load during the last cycle.

The neckable multilayer spunbond/meltblown/spunbond polypropylene material having a width of about 15.75 inches was fed off a "broomstick" unwind and passed through the nip of drive rollers having a peripheral speed from about 3 to about 4 feet per minute. The material was then passed over a series of four steam cans in a "Butterworth treater" arrangement that were heated to about 143° C. (289° F.). The steam cans had a peripheral speed from about 5 to about 6 feet per minute resulting in a residence time on the can of about 180 seconds. The neckable material constricted or necked to a width of about 6 to about 6.5 inches. About half the necking occurred before contact with the steam cans and the remaining necking occurred during contact with the steam cans. The necked material cooled as it passed over several idler rollers and was wound on a driven winder at a speed ranging from about 5 to about 6 feet per minute. The reversibly necked material produced in this manner was tested on the Instron Model 1122 Universal Testing Instrument and the results are reported in Tables 1 and 2 under the heading "Example 1." Most of the tensile properties given in Tables 1 and 2 are reduced by the process while cross-machine direction stretchability is increased. Some of the decrease in tensile properties is due to the increase in basis weight from necking the material.

EXAMPLE 2

A roll of the neckable spunbond/meltblown/spunbond (SMS) polypropylene material of Example 1 having an initial width of about 17 inches was unwound on a "22 inch Face Coating Line" rewind made by the Black-Clawson Company. The wind-up speed was set at about 40 feet per minute and the unwind resistance force was set at 40 pounds per square inch causing the neckable material to neck or constrict to a width of about 10 inches as it was wound up on a roll. The roll of necked material was heated in an AMSCO Eagle Series 2021 Gravity Autoclave at 121° C. for 99 minutes which was thought to be more than the amount of time required to heat the entire roll to the autoclave temperature for more than 300 seconds. The heating cycle was followed by a 60 minute vacuum dry cycle. The reversibly necked material produced in this manner was tested on the Instron Model 1122 Universal Testing Instrument and the results are reported in Tables 3 and 4 under the heading "Example 2." It can be seen from Tables 3 and 4 that, when comparing the reversibly necked material to the neckable material, most tensile properties decreased, elongation to break increased in the cross-machine direction and decreased in the machine direction.

EXAMPLE 3

A neckable web of spunbonded polypropylene having a basis weight of about 0.8 osy was tested on an Instron Model 1122 Universal Testing Instrument. The results are reported in Tables 5 and 7 under the heading "Control 3."

A neckable web of the same material having a width of approximately 17.75 inches was necked to a width of about 6.5 inches and heat treated on a series of steam cans according to the procedure of Example 1. The steam can temperatures were set from about 265 to about 270° F. but the measured temperatures of the steam cans were from about 258 to about 263° F. The residence time of the necked material on the steam cans was about 270 seconds. The results of testing are given in Tables 5 and 6 under the heading "Example 3." It can be seen from Tables 5 and 6 that most tensile values were lowered by the process while cross-machine direction stretchability was increased. Some of the drop in tensile strength is due to the increase in apparent basis weight of the material from necking.

EXAMPLE 4

A 17.75 inch wide roll of the neckable spunbonded polypropylene material of Example 3 having a basis weight of 0.8 osy was necked to a width of about 9 inches according to the procedure of Example 2 on a "22 inch Face Coating Line" rewinder made by the Black-Clawson Company. The unwind speed was set from about 4 to about 5 feet per minute and the unwind brake force was set at about 40 pounds per square inch.

The roll of necked material was heat treated for 6 hours at 120° C. in a Fisher Econotemp ™ Lab Oven Model 30 and allowed to cool. The reversibly necked material produced in this manner was tested on the Instron Model 1122 Universal Testing Instrument and the results are given in Tables 7 and 8 under the heading "Example 4." It can be seen from the Tables that most tensile values were lowered by the process while cross-machine direction stretchability was increased. Some of the drop in tensile strength is due to the increase in apparent basis weight of the material from necking. The process produced consistent results.

EXAMPLE 5

The neckable spunbonded polypropylene material of Example 3 was processed on a 22" Black-Clawson rewinder using the procedure of Example 4. The wind-up speed was set at about 4 to about 5 feet per minute and the unwind resistance force was set at 48 pounds per square inch causing the 17.75 inch wide neckable material to neck or constrict to a width of about 8.5 inches as it was wound up on a roll. The roll of necked material was heated to 120° C. for 6 hours in a Fisher Econotemp ™ Lab Oven Model 30 and allowed to cool. The reversibly necked material was tested on the Instron Model 1122 Universal Testing Instrument and the results are given in Tables 7 and 8 under the heading "Example 5."

EXAMPLE 6

A neckable spunbonded polypropylene web having a basis weight of about 0.8 osy, a width of about 8 inches and a length of about 10 feet was marked at 1 inch increments along both its width and length. This material was wound up without tension onto a 2 inch feed roll of a hand-operated bench scale rewind unit. The neckable material was attached to the take-up roll of the rewind unit and wound with sufficient tension to neck the material to a 5 inch width.

After about ½ hour, about 2 feet of the necked material was unwound from the take-up roll and the distances between the markings were measured. The sample was stretched 5 times to about its original width and then re-measured. The results are shown on Table 9 in the row marked "Not Heat Set".

The remaining necked material on the roll was heat treated in an oven at 116° C. (242° F.) for 1 hour and then cooled to ambient temperature forming a reversibly necked material. Two lengths of reversibly necked material were treated and measured according to the procedure described above. The results are reported in Table 9 under the headings "Heat Set No. 1" and "Heat Set No. 2."

Referring to Table 9, it can be seen that after 5 stretchings the "Not Heat Set" material sample spacings returned very closely to the original one (1) inch separation while the reversibly necked "Heat Set" samples retained most of their reversibly necked dimensions and their cross-machine direction stretch.

EXAMPLE 7

Differential Scanning Calorimetry analysis of a neckable spunbonded polypropylene was performed using a Model 1090 Thermal Analyzer available from DuPont Instruments. The sample size was approximately 3.0 mg and the rate of temperature change was approximately 10° C. per minute. Values for heat of fusion were obtained by numerical integration performed by the Model 1090 Thermal Analyzer. Values for onset of melting were determined from the deviation from linearity in a plot of Heat Flow versus Temperature. The results for the neckable spunbonded polypropylene material are reported in Table 10 under the heading "Not Heat Set".

The spunbonded polypropylene was heated for 2 hours at 130° C. while in the necked condition. The necked material was cooled and then Differential Scanning Calorimetry analysis of the treated samples was performed as described above. The results for the reversibly necked spunbonded polypropylene material are reported in Table 10 under the heading "Heat Set".

As shown in Table 10, the heats of fusion for the "Heat Set" samples are greater than the values for the "Not Heat Set" samples. Additionally, the onset of melting for the "Heat Set" samples occurs at a lower temperature than for the "Not Heat Set" samples.

RELATED APPLICATIONS

This application is one of a group of commonly assigned patent applications which are being filed on the same date. The group includes application Serial No. 07/248,518 in the name of Michael T. Morman and is entitled "Elastomeric Nonwoven Laminate"; and application Serial No. 07/248,833 also in the name of Michael T. Morman, entitled "Elastomeric Neck-Bonded Laminate". The subject matter of these applications is hereby incorporated by reference.

Disclosure of the presently preferred embodiment of the invention is intended to illustrate and not to limit the invention. It is understood that those of skill in the art should be capable of making numerous modifications without departing from the true spirit and scope of the invention.

TABLE 1

| GRAB TENSILES: Corrected | | |
|---|---|---|
| | Control 1 | Example 1 |
| MD TEA | 1.07 ± .28 | .21 ± .02 |
| MD Peak Load | 14.8 ± 2.0 | 12.3 ± .5 |
| MD Elong | 48 ± 6 | 12.3 ± .6 |
| CD TEA | .95 ± .10 | .57 ± .11 |
| CD Peak Load | 14.9 ± .7 | 4.4 ± .6 |
| CD Elong | 44 ± 3 | 150 ± 13 |

TABLE 2

| CYCLE: | 1 | 2 | 3 | 4 | To Break |
|---|---|---|---|---|---|
| Control 1 | | | | | |
| Cycled in cross-machine direction at 25% CD Elongation | | | | | |
| Peak TEA | .70 ± .04 | .25 ± .01 | .20 ± .01 | .184 ± .005 | .882 ± .08 |
| Peak Load | 15.9 ± 1.0 | 13.2 ± .7 | 12.2 ± .7 | 11.6 ± .5 | 18.3 ± .8 |
| Perm. Set | 35 ± 3 | 39 ± 5 | 45 ± 3 | 46 ± 3 | 38 ± 2 |
| Example 1 | | | | | |
| Cycled in cross-machine direction at 85% CD Elongation | | | | | |
| Peak TEA | .095 ± .007 | .035 ± .003 | .029 ± .003 | .026 ± .003 | .600 ± .1 |
| Peak Load | .881 ± .1 | .786 ± .1 | .746 ± .1 | .722 ± .1 | 4.23 ± .4 |

TABLE 2-continued

| CYCLE: | 1 | 2 | 3 | 4 | To Break |
|---|---|---|---|---|---|
| Perm. Set | 26 ± 1 | 30 ± 1 | 34 ± .5 | 41. ± 1 | 154 ± 11 |

TABLE 3

| GRAB TENSILES: | Control 1 | Example 2 |
|---|---|---|
| MD TEA | 1.07 ± .28 | .27 ± .05 |
| MD Peak Load | 14.8 ± 2.0 | 9.0 ± .8 |
| MD Elong | 48 ± 6 | 22 ± 3 |
| CD TEA | .95 ± .10 | .46 ± .08 |
| CD Peak Load | 14.9 ± .7 | 6.7 ± .4 |
| CD Elong | 44 ± 3 | 93 ± 6 |

TABLE 4

| CYCLE: | 1 | 2 | 3 | 4 | To Break |
|---|---|---|---|---|---|
| Control 1 Cycled in cross-machine direction at 25% CD Elongation | | | | | |
| Peak TEA | .70 ± .04 | .25 ± .01 | .20 ± .01 | .184 ± .005 | .882 ± .08 |
| Peak Load | 15.9 ± 1.0 | 13.2 ± .7 | 12.2 ± .7 | 11.6 ± .5 | 18.3 ± .8 |
| Perm. Set | 35 ± 3 | 39 ± 5 | 45 ± 3 | 46 ± 3 | 38 ± 2 |
| Example 2 Cycled in cross-machine direction at 52% CD Elongation | | | | | |
| Peak TEA | .028 ± .008 | .013 ± .004 | .012 ± .003 | .013 ± .006 | .706 ± .07 |
| Peak Load | .665 ± .2 | .57 ± .17 | .54 ± .15 | .52 ± .15 | 7.95 ± .4 |
| Perm. Set | 26 ± 1 | 30 ± 2 | 33 ± 1 | 43 ± 6 | 97 ± 3 |

TABLE 5

| GRAB TENSILES: | Control 3 | Example 3 |
|---|---|---|
| MD TEA | 1.38 ± .25 | .25 ± .07 |
| MD Peak Load | 17.9 ± .6 | 15.5 ± 2.3 |
| MD Elong | 56 ± 6 | 12 ± 2 |
| CD TEA | 1.5 ± .1 | .37 ± .07 |
| CD Peak Load | 16.3 ± .6 | 2.9 ± .4 |
| CD Elong | 67 ± 3 | 179 ± 10 |

TABLE 6

| CYCLE: | 1 | 2 | 3 | 4 | To Break |
|---|---|---|---|---|---|
| Example 3 Cycled in machine direction at 6.5% MD Elongation | | | | | |
| Peak TEA | .176 ± .01 | .124 ± .01 | .125 ± .002 | .11 ± .006 | .504 ± .1 |
| Peak Load | 20.9 ± .8 | 17.8 ± .8 | 17.9 ± .4 | 16.6 ± .5 | 33 ± 3 |
| Perm. Set | | | | 13 ± 2 | 10 ± 1.0 |
| Example 3 Cycled in cross-machine direction at 85% CD Elongation | | | | | |
| Peak TEA | .05 ± .006 | .022 ± .002 | .017 ± .002 | .016 ± .002 | .257 ± .06 |
| Peak Load | .91 ± .12 | .81 ± .11 | .77 ± .1 | .75 ± .1 | 2.45 ± .17 |
| Perm. Set | 27 ± 3 | 31 ± 1 | 35 ± .5 | 49 ± 8 | 144 ± 8 |

TABLE 7

| GRAB TENSILES: | Control 3 | Example 4 | Example 5 |
|---|---|---|---|
| MD TEA | 1.38 ± .25 | .25 ± .06 | .22 ± .02 |
| MD Peak Load | 17.9 ± .6 | 10.6 ± 1.0 | 10.7 ± .5 |
| MD Elong | 56 ± 6 | 16 ± 2 | 15 ± 2 |
| CD TEA | 1.5 ± .1 | .28 ± .05 | .33 ± .07 |
| CD Peak Load | 16.3 ± .6 | 3.7 ± .5 | 4.1 ± .7 |
| CD Elong | 67 ± 3 | 143 ± 6 | 157 ± 7 |

TABLE 8

| CYCLE: | 1 | 2 | 3 | 4 | To Break |
|---|---|---|---|---|---|
| Example 4 Cycled in cross-machine direction at 80% CD elongation | | | | | |
| Peak TEA | .033 ± .006 | .020 ± .003 | .018 ± .003 | .017 ± .002 | .41 ± .01 |
| Peak Load | .325 ± .07 | .30 ± .07 | .29 ± .06 | .28 ± .06 | 4.51 ± .6 |
| Perm. Set | 26 ± 1 | 30 ± 1 | 32 ± 2 | 42 ± 1 | 138 ± 6 |

TABLE 9

| | INCHES | | | |
|---|---|---|---|---|
| | SPACING BEFORE STRETCHES (INCHES) | | SPACING AFTER 5 STRETCHES (INCHES) | |
| SAMPLE | MD | CD | CD | MD |
| Not Heat Set | 1.094 ±.026 | .795 ±.017 | .982 ±.017 | 1.049 ±.025 |
| Heat Set No. 1 | 1.19 ±.03 | .630 ±.04 | .73 ±.016 | 1.16 ±.03 |
| Heat Set No. 2 | 1.23 ±.04 | .61 ±.06 | 0.71 ±.05 | 1.22 ±.04 |

TABLE 10

| | Not Heat Set | Heat Set |
|---|---|---|
| Heat of Fusion | 83.9 | 95.9 |
| | 86.1 | 90.5 |

TABLE 10-continued

| | | |
|---|---|---|
| (J/g) | 84.0 | 90.5 |
| AVERAGE | 84.6 ± 1.2 | 92.3 ± 3.1 |
| Onset of | 128 | 118 |
| Melting | 133 | 118 |
| (°C.) | 132 | 114 |
| AVERAGE | 131 ± 2.6 | 117 ± 2.3 |

| CYCLE: | 1 | 2 | 3 | 4 | To Break |
|---|---|---|---|---|---|
| Example 5 Cycled in machine direction at 8.3% MD Elongation ||||||
| Peak TEA | .18 ± .01 | .122 ± .01 | .11 ± .004 | .11 ± .007 | .329 ± .07 |
| Peak Load | 15.4 ± .6 | 13.2 ± .6 | 12.7 ± .4 | 12.4 ± .5 | 19.4 ± 1.1 |
| Perm. Set | | | | 18.8 ± 1.6 | 10.8 ± 1.2 |
| Example 5 Cycled in cross-machine direction at 88% CD Elongation ||||||
| Peak TEA | .019 ± .002 | .005 ± .0009 | .003 ± .001 | .002 ± .001 | .390 ± .130 |
| Peak Load | .260 ± .084 | .24 ± .074 | .233 ± .006 | .226 ± .069 | 4.12 ± .608 |
| Perm. Set | 25 ± 2 | 30 ± 2 | 32 ± 1 | 38 ± 1 | 151 ± 13 |

What is claimed is:

1. A reversibly necked material adapted to stretch at least about 75 percent and recover at least about 50 percent when stretched about 75 percent wherein said reversibly necked material has been necked by drawing at ambient temperature and then heated and cooled while in a necked configuration so that the material possesses a greater heat of fusion than before being reversibly necked.

2. A reversibly necked material adapted to stretch at least about 75 percent and recover at least about 50 percent when stretched about 75 percent wherein said reversibly necked material has been necked by drawing at ambient temperature and then heated and cooled while in a necked configuration so that the material possesses a greater heat of fusion than before being reversibly necked.

3. The material of claim 2 wherein said reversibly necked material comprises a web selected from the group consisting of a bonded carded web, a web of spunbonded fibers, a web of meltblown fibers, and a multilayer material of at least one web of meltblown fibers and at least one web of spunbonded fibers.

4. The material of claim 3 wherein said meltblown fibers include meltblown microfibers.

5. The material of claim 3 wherein said fibers comprise a polymer selected from the group consisting of polyolefins, polyesters, and polyamides.

6. The material of claim 5 wherein said polyolefin is selected from the group consisting of one or more of polyethylene, polypropylene, polybutene, ethylene copolymers, propylene copolymers, and butene copolymers.

7. The material of claim 2 wherein said reversibly necked material is a composite material comprising a mixture of meltblown fibers and one or more secondary materials selected from the group consisting of textile fibers, wood pulp fibers, particulates and super-absorbent materials.

8. The material of claim 1 wherein said reversibly necked material is adapted to stretch at least about 125 percent and recover at least about 50 percent when stretch about 125 percent.

9. The material of claim 2 wherein said reversibly necked material is adapted to stretch at least about 125 percent and recover at least about 50 percent when stretched about 125 percent.

10. A reversibly necked polypropylene web adapted to stretch at least about 75 percent and recover at least about 50 percent when stretched about 75 percent, wherein said reversibly necked polypropylene web has been necked by drawing at ambient temperature and then heated and cooled while in a necked configuration so that the material has a greater heat of fusion than before being reversibly necked.

11. A reversibly necked polypropylene web adapted to stretch at least about 75 percent and recover at least about 50 percent when stretched about 75 percent, wherein said reversibly necked polypropylene web has been necked by drawing at ambient temperature and then heated and cooled while in a necked configuration so that the material possesses a greater heat of fusion than before being reversibly necked.

12. The material of claim 11 wherein said reversibly necked polypropylene web comprises a web selected from the group consisting of a bonded carded web of fibers, a web of spunbonded fibers, a web of meltblown fibers, and a multilayer material of at least one web of meltblown fibers and at least one web of spunbonded fibers.

13. The material of claim 11 wherein said meltblown fibers include meltblown microfibers.

14. The material of claim 11 wherein said reversibly necked polypropylene web is a composite material comprising a mixture meltblown fibers and one or more secondary materials selected from the group consisting of textile fibers, wood pulp fibers, particulates and super-absorbent materials.

15. The material of claim 10 wherein said reversibly necked material is adapted to stretch at least about 125 percent and recover at least about 50 percent when stretched about 125 percent.

16. The material of claim 11 wherein said reversibly necked material is adapted to stretch at least about 125 percent and recover at least about 50 percent when stretched about 125 percent.

17. A multilayer material including at least one material which is reversibly necked by drawing at ambient temperature and then heating and cooling while in a necked configuration so that the material possess a greater heat of fusion than before reversibly necked.

18. A multilayer material comprising at least two reversibly necked materials adapted to stretch at least about 75 percent and recover at least about 50 percent when stretched about 75 percent, and wherein said reversibly necked materials have been necked by drawing at ambient temperature and then heated and cooled while in a necked configuration so that the materials posses a greater heat of fusion than before being reversibly necked.

19. A multilayer material comprising at least two reversibly necked materials adapted to stretch at least about 75 percent and recover at least about 50 percent when stretched about 75 percent, and wherein said reversibly necked materials have been necked by drawing at ambient temperature and then heated and cooled while in a necked configuration so that the materials posses a greater heat of fusion than before being reversibly necked.

20. The material of claim 19 wherein said reversibly necked material comprises a web selected from the group consisting of a bonded carded web, a web of spunbonded fibers, and a web of meltblown fibers.

21. The material of claim 18 wherein said reversibly necked material is adapted to stretch at least about 125 percent and recover at least about 50 percent when stretched about 125 percent.

22. The material of claim 19 wherein said reversibly necked material is adapted to stretch at least about 125 percent and recover at least about 50 percent when stretched about 125 percent.

23. A reversibly necked material adapted to stretch at least about 125 percent and recover at least about 50 percent when stretched about 125 percent.

24. A reversibly necked coherent web formed of fibers joined solely by interfiber bonder, said web being adapted to stretch at least about 75 percent and recover at least about 50 percent when stretched about 75 percent wherein said reversibly necked web has been necked by drawing at ambient temperature and then heated and cooled while in a necked configuration so that the web posses a greater heat of fusion than before being reversibly necked and wherein said fibers are joined solely by interfiber bonding to form a coherent web structure.

25. A reversibly necked coherent web formed of fibers joined solely by interfiber bonder, said web being adapted to stretch at least about 75 percent and recover at least about 50 percent when stretched about 75 percent wherein said reversibly necked web has been necked by drawing at ambient temperature and then heated and cooled while in a necked configuration so that the web possesses a lower onset of melting than before being reversibly necked and wherein said fibers are joined solely by interfiber bonding to form a coherent web structure.

* * * * *

UNITED STATES PATENT AND TRADEMARK OFFICE
CERTIFICATE OF CORRECTION

PATENT NO. : 4,965,122

DATED : October 23, 1990

INVENTOR(S) : Michael T. Morman

It is certified that error appears in the above-identified patent and that said Letters Patent is hereby corrected as shown below:

Column 1, line 43, "stretching length of" should read --stretching of--

Column 15, claim 2, lines 34-35, "possesses a greater" should read --possesses a lower--

Column 16, claim 11, lines 30-31, "possesses a greater" should read --has a lower--

Column 17, claim 9, lines 10-11, "posses a greater" should read --possess a lower--

Column 18, claim 24, line 5, "bonder," should read --bonding,--

Column 18, claim 24, line 11, "posses" should read --possesses--

Column 18, claim 25, line 16, "bonder," should read --bonding,--

Signed and Sealed this

Twenty-ninth Day of June, 1993

Attest:

MICHAEL K. KIRK

Attesting Officer

Acting Commissioner of Patents and Trademarks